United States Patent
No et al.

(10) Patent No.: US 12,481,431 B2
(45) Date of Patent: Nov. 25, 2025

(54) MEMORY CONTROLLER, MEMORY SYSTEM INCLUDING THE SAME, AND OPERATION METHOD OF MEMORY CONTROLLER FOR PERFORMING READ OPERATION BASED ON READ VOLTAGE LEVEL

(71) Applicant: SAMSUNG ELECTRONICS CO., LTD., Suwon-si (KR)

(72) Inventors: Haedong No, Suwon-si (KR); Youjin Jeon, Suwon-si (KR); Minjin Jo, Suwon-si (KR); Younsoo Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 58 days.

(21) Appl. No.: 18/535,459

(22) Filed: Dec. 11, 2023

(65) Prior Publication Data

US 2024/0272808 A1    Aug. 15, 2024

(30) Foreign Application Priority Data

Feb. 15, 2023    (KR) ........................ 10-2023-0020120

(51) Int. Cl.
| | | |
|---|---|---|
| G06F 12/00 | (2006.01) | |
| G06F 3/06 | (2006.01) | |
| G11C 11/56 | (2006.01) | |
| G11C 16/04 | (2006.01) | |
| G11C 16/26 | (2006.01) | |

(52) U.S. Cl.
CPC .......... *G06F 3/0619* (2013.01); *G06F 3/0659* (2013.01); *G06F 3/0679* (2013.01); *G11C 11/5642* (2013.01); *G11C 11/5671* (2013.01); *G11C 16/0483* (2013.01); *G11C 16/26* (2013.01)

(58) Field of Classification Search
CPC .... G06F 3/0619; G06F 3/0659; G06F 3/0679; G06F 3/0658; G06F 3/0614; G06F 2212/1032; G11C 11/5642; G11C 11/5671; G11C 16/0483; G11C 16/26
USPC ........................................................ 711/103
See application file for complete search history.

(56) References Cited

U.S. PATENT DOCUMENTS 8,760,932 B2    6/2014 Sridharan et al.
9,111,626 B2    8/2015 Kim et al.
(Continued)

FOREIGN PATENT DOCUMENTS

KR        10-2038408 B1      10/2019
KR    10-2022-0072380 A       6/2022

*Primary Examiner* — Mardochee Chery
(74) *Attorney, Agent, or Firm* — Sughrue Mion, PLLC

(57) ABSTRACT

Provided is a method of operating a memory controller for controlling a memory device including a plurality of memory cells, the method including transmitting a valley search command for threshold voltage distribution of the memory cells to the memory device, obtaining a cell count value and a valley voltage level from the memory device, obtaining a determined offset value by searching an offset table based on the cell count value and the valley voltage level, and determining a corrected read voltage level by correcting the valley voltage level based on obtained the offset value, wherein the memory device is controlled so that the memory device performs a read operation through the corrected read voltage level.

18 Claims, 15 Drawing Sheets

(56) References Cited

U.S. PATENT DOCUMENTS

| | | | |
|---|---|---|---|
| 9,190,159 B2 | 11/2015 | Kurosawa | |
| 9,812,213 B2 | 11/2017 | Kim et al. | |
| 10,163,518 B2 | 12/2018 | Yoon et al. | |
| 11,475,972 B2 | 10/2022 | Yang et al. | |
| 11,532,364 B2 | 12/2022 | Kim | |
| 2022/0100413 A1 | 3/2022 | Kim | |
| 2022/0172785 A1* | 6/2022 | Yoo | G11C 11/5671 |
| 2022/0189575 A1* | 6/2022 | Seo | G11C 7/1039 |
| 2022/0222138 A1* | 7/2022 | Park | G11C 29/021 |

* cited by examiner

| | | | |
|---|---|---|---|
| RP1 | CNTV | CTNV < C1 | CNTV >= C1 |
| | offset | ORV1 | ORV2 |
| RP2 | CNTV | CTNV < C2 | CNTV >= C2 |
| | offset | ORV3 | ORV4 |
| RP3 | CNTV | CTNV < C3 | CNTV >= C3 |
| | offset | ORV5 | ORV6 |
| RP4 | CNTV | CTNV < C4 | CNTV >= C4 |
| | offset | ORV7 | ORV8 |
| RP5 | CNTV | CTNV < C5 | CNTV >= C5 |
| | offset | ORV9 | ORV10 |
| RP6 | CNTV | CTNV < C6 | CNTV >= C6 |
| | offset | ORV11 | ORV12 |
| RP7 | CNTV | CTNV < C7 | CNTV >= C7 |
| | offset | ORV13 | ORV14 |

MEMORY CONTROLLER, MEMORY SYSTEM INCLUDING THE SAME, AND OPERATION METHOD OF MEMORY CONTROLLER FOR PERFORMING READ OPERATION BASED ON READ VOLTAGE LEVEL

CROSS-REFERENCE TO RELATED APPLICATION

This application is based on and claims priority under 35 U.S.C. § 119 to Korean Patent Application No. 10-2023-0020120, filed on Feb. 15, 2023, in the Korean Intellectual Property Office, the disclosure of which is incorporated by reference herein in its entirety.

BACKGROUND

1. Field

The disclosure relates to a memory controller, a memory system including the memory controller, and a method performed by the memory controller, and more particularly, to a memory controller and a method for correcting a read voltage level through an offset table.

2. Description of Related Art

Recently, there is a demand for increased capacity and high integration of memory devices due to various multi-functional utilization of information and communication devices. In a memory device, a memory cell may deteriorate for various reasons, such as repeated program/erase operations on a memory cell or exposure to a high temperature for a long time. A valley search operation for threshold voltage distribution of memory cells in the memory device may be performed. However, when a memory cell degrades, an error may occur when a read operation is performed at a valley voltage level found through a valley search operation.

SUMMARY

One or more aspects of the disclosure relates to an apparatus, a system and/or a method for improving reliability of a memory during a data read operation by correcting a valley voltage level found through a valley search operation.

According to an aspect of the disclosure, there is provided a method of operating a memory controller for controlling a memory device including memory cells, the method including: transmitting a valley search command to the memory device; obtaining a cell count value and a valley voltage level from the memory device; obtaining an offset value by searching an offset table based on the cell count value and the valley voltage level; determining a read voltage level based on the valley voltage level and the offset value; and controlling the memory device to perform a read operation based on the read voltage level.

According to another aspect of the disclosure, there is provided a memory controller including: an offset table including a plurality of offset values; and a processor configured to: transmit a valley search command to a memory device including memory cells; obtain an offset value, among the plurality of offset values, based on a cell count value and a valley voltage level obtained from the memory device; determine a read voltage level based on the valley voltage level and the offset value; and control the memory device to perform a read operation based on the read voltage level.

According to another aspect of the disclosure, there is provided a memory system including: a memory cell array including memory cells; and a memory device including a control logic configured to control a read operation of the memory cells; and a memory controller including: an offset table including a plurality of offset values; and a processor configured to: transmit a valley search command to a memory device including a plurality of memory cells; obtain an offset value, among the plurality of offset values, based on a cell count value and a valley voltage level obtained from the memory device; determine a read voltage level based on the valley voltage level and the offset value; and control the memory device to perform a read operation based on the read voltage level, wherein the control logic is further configured to: generate valley search information including the cell count value and the valley voltage level obtained by performing, by the memory device, a valley search sensing operation on a threshold voltage distribution of the memory cells.

The technical problems and solutions of the disclosure are not limited to the technical problems and solutions mentioned above, and other technical problems and solutions not mentioned will be clearly understood by those skilled in the art from the description below.

BRIEF DESCRIPTION OF DRAWINGS

Embodiments will be more clearly understood from the following detailed description taken in conjunction with the accompanying drawings in which:

FIG. 9 is a diagram for explaining an offset table according to an embodiment;

DETAILED DESCRIPTION OF THE EMBODIMENTS

Figure 1:
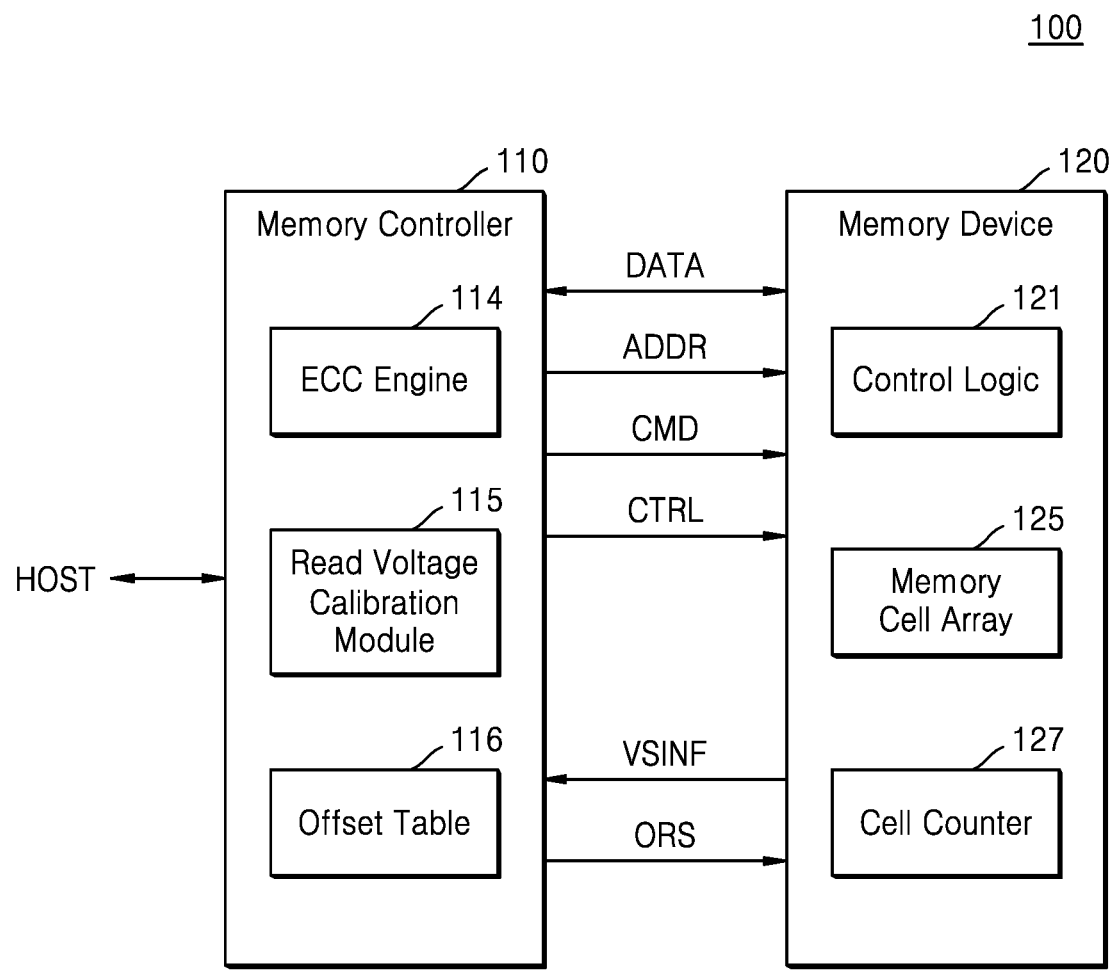
FIG. 1 is a block diagram illustrating a memory system according to an embodiment.

Hereinafter, embodiments will be described in detail with reference to the accompanying drawings. When describing with reference to the drawings, the same or corresponding components are given the same reference numerals, and overlapping descriptions thereof will be omitted.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

These embodiments are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

FIG. 1 is a block diagram illustrating a memory system 100 according to an embodiment.

The memory system 100 may include a memory controller 110 and a memory device 120. According to an embodiment, the memory system 100 may be implemented as an internal memory embedded in an electronic device. For example, the memory system 100 may be an embedded Universal Flash Storage (UFS) memory device, an embedded Multi-Media Card (eMMC), or a Solid State Drive (SSD). According to an embodiment, the memory system 100 may be implemented as an external memory removable from an electronic device. For example, the memory system 100 may include at least one of a UFS memory card, a Compact Flash (CF) memory card, a Secure Digital (SD) memory card, a Micro Secure Digital (Micro-SD) memory card, a Mini Secure Digital (Mini-SD) memory card, an Extreme Digital (xD) memory card, and a Memory Stick.

The memory controller 110 may control the memory device 120 to read data stored in the memory device 120 or write data to the memory device 120 based on or in response to a read/write request from a host HOST. For example, the memory controller 110 may control write, read, and erase operations of the memory device 120 by providing an address ADDR, a command CMD, and a control signal CTRL to the memory device 120. Also, data DATA may be transmitted and received between the memory controller 110 and the memory device 120. The data DATA may be data for programming or writing into the memory device 120 and read from the memory device 120.

The memory controller 110 may include an Error Correction Code (ECC) engine 114, a read voltage calibration module 115, and an offset table 116. The ECC engine 114 may be configured to detect an error in data read from the memory device 120 using an ECC and correct the error. The ECC engine 114 may include any of various circuits, systems, or devices for error correction. When the ECC engine 114 performs error correction and the number of error bits is greater than a correction threshold, error correction may fail. According to an embodiment, the memory controller 110 may transmit a valley search command to the memory device 120 based on whether the ECC engine 114 successfully corrects errors or based on whether the ECC engine 114 is capable of successfully correcting the errors.

The read voltage calibration module 115 may be configured to determine an optimal read voltage level. The optimal read voltage level may refer to a voltage level at which the least number of error bits occurs during a read operation among the threshold voltage levels corresponding to the distribution valley found on the threshold voltage distribution through the valley search operation. Hereinafter, the optimal read voltage level may refer to a corrected read voltage level. For example, the read voltage calibration module 115 may search the offset table 116 for the offset value based on the valley search information VSINF received from the memory device 120, and then correct the read voltage level by correcting the valley voltage level with the offset value determined according to the search result. The read voltage calibration module 115 may transfer a read voltage correction signal ORS to the memory device 120, and the memory device 120 may be controlled so that the memory device 120 may perform a read operation with the corrected read voltage level. The read voltage correction signal ORS may include a corrected read voltage level. The corrected read voltage level may refer to a voltage level obtained by correcting a valley voltage level with an offset value.

According to an embodiment, the read voltage calibration module 115 searches the offset table 116 based on the cell count value and the valley voltage level included in the valley search information VSINF to obtain an offset value. The offset value may be referred to as a correction value. The read voltage calibration module 115 may determine a value obtained by adding the offset value obtained from the offset table 116 and the valley voltage level obtained from the memory device 120 as the corrected read voltage level.

The read voltage calibration module 115 may control the memory device 120 to perform a read operation based on the corrected read voltage level. According to an embodiment, the read voltage calibration module 115 may be implemented as firmware or software that corrects the read voltage of the memory device 120 and may be implemented as hardware capable of performing such a series of operations.

The offset table 116 may include a plurality of offset values necessary for the read voltage calibration module 115 to correct the read voltage of the memory device 120. A plurality of offset values included in the offset table 116 may be values previously input to the memory controller 110. A plurality of offset values included in the offset table 116 may be classified and stored according to information corresponding to a cell count value and a state of a memory cell indicating a value stored in memory cells on a threshold voltage distribution. Hereinafter, the state of a memory cell may refer to the number of cases that may correspond to the logical state of each memory cell. In other words, the state of a memory cell may refer to a logical state representing data programmed or written into each memory cell. Accordingly, the logical states may respectively correspond to a plurality of threshold voltage distribution levels formed on the threshold voltage distribution. A detailed description of the offset table 116 is given below with reference to FIGS. 2 and 9.

The memory device 120 may include a control logic 121, a memory cell array 125, and a cell counter 127. The control logic 121 may perform bit line pre-charging, a valley search operation for finding a distribution valley, a read voltage level determination, and a main sensing operation for reading. The control logic 121 may generate valley search information VSINF by performing a valley search operation. The control logic 121 may transmit the generated valley search information VSINF to the memory controller 110.

According to an embodiment, a distribution valley corresponding to a threshold voltage distribution of memory cells included in the memory cell array 125 may be found through a valley search operation. The valley search operation may be performed according to a series of algorithms, and for example, such an algorithm may be referred to as a Less Read Estimation (LRE) algorithm.

According to an embodiment, the valley search information VSINF may include read voltage level information and cell count values corresponding to a distribution valley detected according to the valley search operation of the control logic 121. Hereinafter, the read voltage level corresponding to the distribution valley may refer to a threshold voltage value corresponding to a point where the slope is 0 or a minimum point on the distribution valley, and this may be referred to as a valley voltage level. A cell count value corresponding to a distribution valley may refer to the number of memory cells belonging to a threshold voltage region adjacent to a valley voltage level. A detailed description of the distribution valley is given below with reference to FIGS. 7A and 7B.

The memory cell array 125 may include a plurality of memory cells. For example, the plurality of memory cells may be flash memory cells. The cell counter 127 may count the number of memory cells included in a specific threshold voltage region based on a result of the valley search operation on the memory cell array 125 and transmit the counting result to the control logic 121.

In an ideal scenario, the threshold voltage distribution corresponding to memory cells included in the memory device 120 may form a symmetrical distribution. However, memory cells may degrade over time. For example, memory cells may be deteriorated by repeated program/erase operations and memory cells may be deteriorated by exposure to high temperatures for a long time. As such, due to deterioration of the memory cells, threshold voltage distributions corresponding to the degraded memory cells may form an asymmetrical distribution. Due to the asymmetry of the threshold voltage distribution, an error may occur even if the read operation is performed according to the valley voltage level corresponding to the valley derived through the valley search operation. Therefore, it may be necessary to correct the valley voltage level derived through the valley search operation. According to an embodiment, an offset value is selected from among a plurality of pre-entered offset values based on a valley voltage level and a cell count value corresponding to the valley voltage level and the read voltage level may be corrected using the selected offset value as a correction value. Accordingly, the memory device 120 may perform a read operation with the corrected read voltage level, and the error rate of the read operation may be reduced, and thus, the reliability of the memory system 100 according to the inventive concept may be improved.

Figure 2:
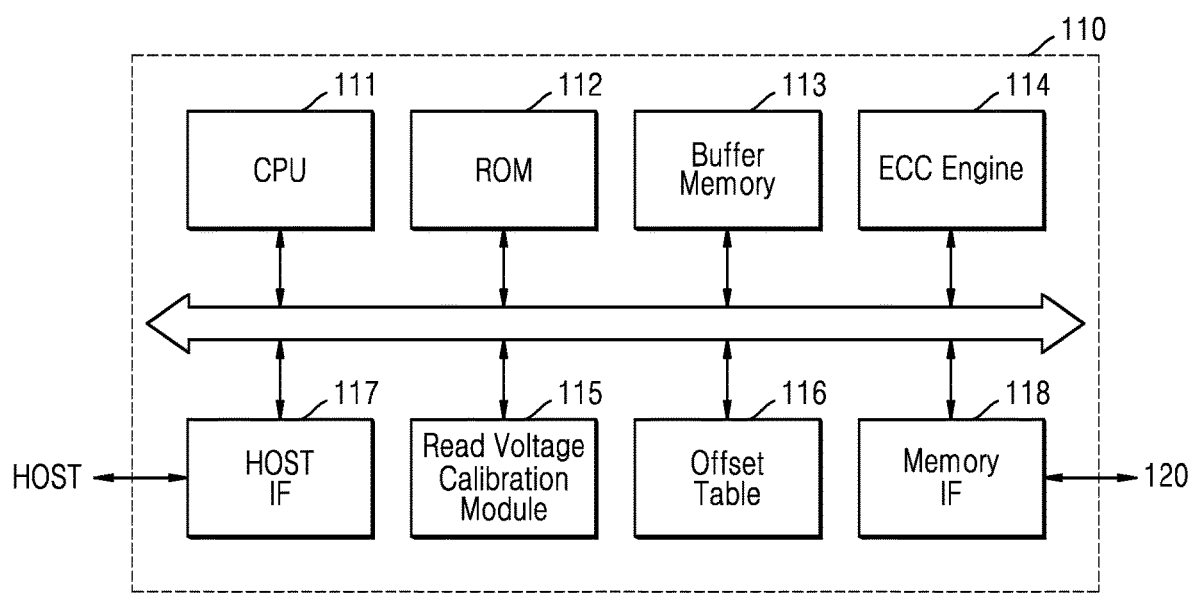
FIG. 2 is a block diagram illustrating a memory controller according to an embodiment.

FIG. 2 is a block diagram illustrating a memory controller 110 according to an embodiment. FIG. 2 may be described with reference to FIG. 1, and redundant description may be omitted.

The memory controller 110 may include a central processing unit (CPU) 111, read-only memory (ROM) 112, a buffer memory 113, an ECC engine 114, a read voltage calibration module 115, an offset table 116, a host interface 117, and a memory interface 118. According to an embodiment, the components of the memory controller 110 may be implemented in hardware or software. For example, the read voltage calibration module 115 and the offset table 116 may be implemented in hardware or software. According to an embodiment, the components implemented by as software may be executed by a processor such as the CPU 111.

The CPU 111 may control some or all operations of the memory system 100. For example, the CPU 111 may control the memory system 100 to decrypt a command received from the host HOST and perform an operation according to the decoded result. The CPU 111 executes firmware loaded in the ROM 112 of the memory controller 110, so that garbage collection, address mapping, and wear leveling for managing the memory device 120 (see FIG. 1) may be performed. According to an embodiment, the CPU 111 may drive the read voltage calibration module 115.

The ROM 140 may be read-only memory that stores programs executed by the CPU 111. A program realizing an operating method of the memory controller 110 or firmware in which the program is recorded may be stored in the ROM 140. Firmware may include three hierarchical structures, for example, a host interface layer (HIL), a flash translation layer (FTL), and a flash interface layer (FIL). According to an embodiment, firmware may be stored in a memory device.

In the buffer memory 113, software or firmware for operating the memory system may be loaded from the ROM 140 or from the memory device 120. Also, data transmitted from the host, data generated by the CPU 111, and data read from the memory device 120 may be temporarily stored in the buffer memory 113. The buffer memory 113 may include at least one of dynamic random access memory (DRAM) and static random access memory (SRAM). According to an embodiment, the buffer memory 113 may be included in the memory controller 110 but may be disposed outside the memory controller 110. Also, although only one buffer memory 113 is shown in FIG. 2, the memory controller 110 may include two or more buffer memories.

The ECC engine 114 may perform an error detection and correction function for read data read from the memory device 120. More specifically, the ECC engine 114 may generate parity bits for write data to be written in the memory device 120, and the parity bits generated in this way may be stored in the memory device 120 together with write data. When reading data from the memory device 120, the ECC engine 114 may correct an error in the read data using parity bits read from the memory device 120 together with the read data, and output the read data with the error corrected. According to an embodiment, error correction may fail if the number of erroneous bits in the read data exceeds a limit that the ECC engine 114 may correct. In this case, the memory controller 110 may determine that the read voltage needs to be corrected and transmit a valley voltage search command to the memory device 120.

The read voltage calibration module 115 may determine read voltage correction according to whether error correction of the data read from the memory device 120 by the ECC engine 114 has been successful.

For example, if error correction is successful, the read voltage calibration module 115 may determine not to correct the read voltage. Accordingly, the read voltage calibration module 115 may control the memory device 120 to perform a read operation without correcting the read voltage.

On the other hand, if error correction fails, the read voltage calibration module 115 may determine read voltage correction. The read voltage calibration module 115 may transmit a valley search command to the memory device 120 based on a determination to correct the read voltage. Accordingly, the memory device 120 may perform a valley search operation, and the read voltage calibration module 115 may receive, from the memory device 120, valley search information VSINF (see FIG. 1) generated by the memory device 120 performing a valley search operation.

The read voltage calibration module 115 may search the offset table 116 for the offset value based on the cell count value and the valley voltage level included in the valley search information VSINF. The read voltage calibration module 115 may obtain an offset value corresponding to a search result of the offset table 116. That is, the read voltage calibration module 115 may obtain an offset value corresponding to a cell count value and a valley voltage level.

The read voltage calibration module 115 searches the offset table 116 and determines that a value obtained by adding the obtained offset value to the valley voltage level becomes the corrected read voltage level. The read voltage calibration module 115 may transmit a read voltage correction signal ORS (see FIG. 1) to the memory device 120 to enable the memory device 120 to perform a read operation based on the determined corrected read voltage level.

The offset table 116 may include a plurality of offset values necessary for the read voltage calibration module 115 to correct the read voltage of the memory device 120. According to an embodiment, a plurality of offset values stored in the offset table 116 may be divided into two variables and previously input (or uploaded) to the memory controller 110. In other words, the plurality of offset values may be values previously stored in the memory controller 110. The first variable may be a variable indicating a state of memory cells that may be read through a read voltage (i.e., a state indicating a value stored in the memory cells) on a threshold voltage distribution of memory cells. That is, the first variable may be a variable representing a first state to an Nth state (N is a natural number greater than 1). For example, if the memory cell array 125 (in FIG. 1) is composed of triple level cells (TLCs), N may be 8, and states corresponding to the threshold voltage distribution of memory cells may be the first to eighth states. The offset values may be stored according to which state of the first to eighth states corresponds to the valley voltage level. The second variable may be a variable for identifying a cell count section in which the cell count value is included. For example, the offset table 116 may include a plurality of cell count sections. A detailed description of the structure of the offset table 116 is described later with reference to FIG. 9.

The host interface 117 may transmit packets to the host HOST or receive packets from the host HOST. A packet transmitted from the host HOST to the host interface 117 may include a command or data to be stored in the memory device 120, and a packet transmitted from the host interface 117 to the host HOST may include a response to a command or data read from the memory device 120. However, the disclosure is not limited thereto, and as such, other information, data or signal may be exchanged between the host HOT and the memory controller 110 through the host interface 117.

The memory interface 118 may transmit data to be written in the memory device 120 to the memory device 120 or may receive data read from the memory device 120. This memory interface 118 may be implemented to comply with standard protocols such as Toggle or Open NAND Flash Interface (ONFI).

Figure 3:
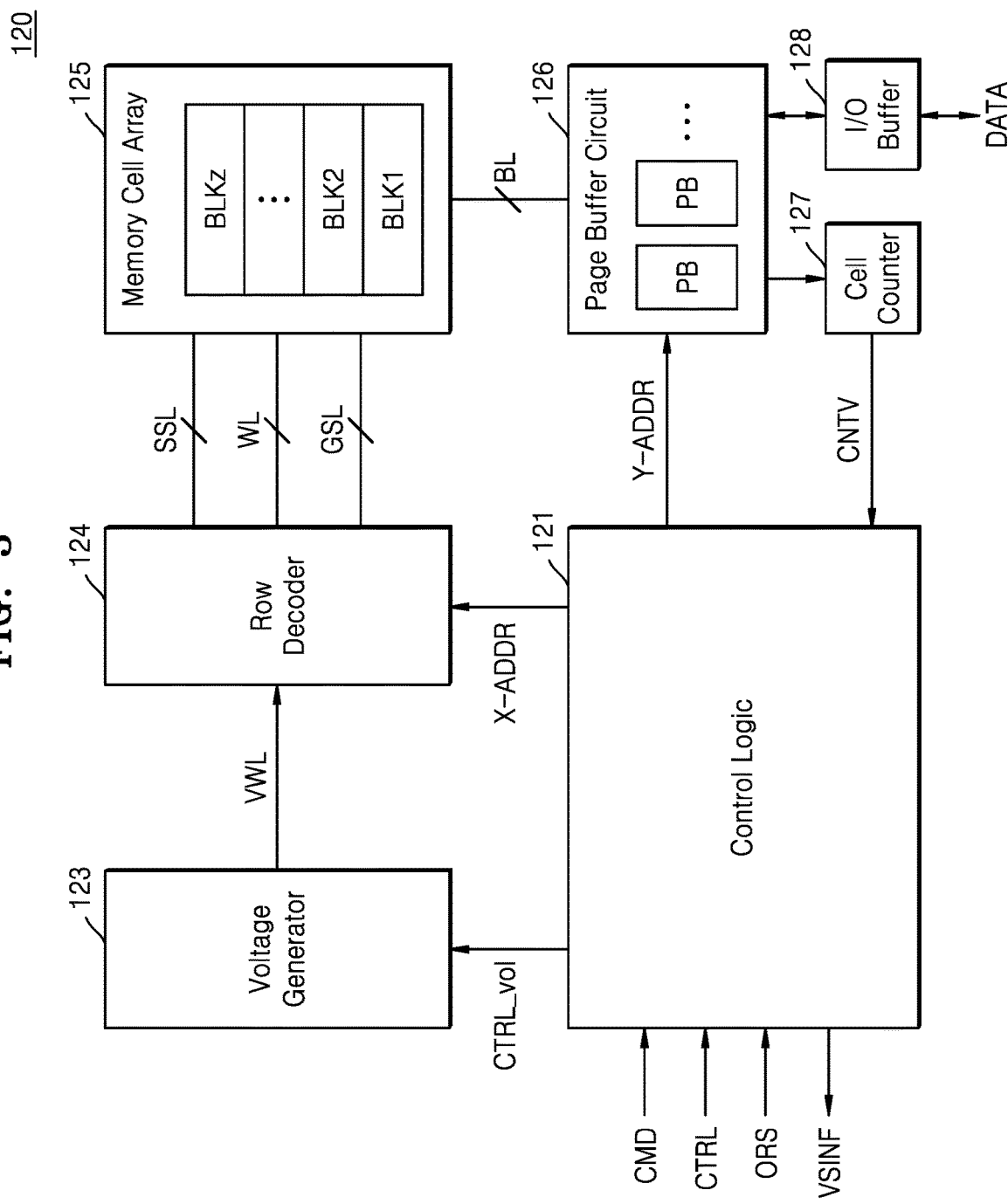
FIG. 3 is a block diagram illustrating a memory device according to an embodiment.

FIG. 3 is a block diagram illustrating a memory device 120 according to an embodiment.

Referring to FIG. 3, the memory device 120 may include a control logic 121, a voltage generator 123, a row decoder 124, a memory cell array 125, a page buffer circuit 126, a cell counter 127, and an I/O buffer 128.

The memory device 120 may further include various other components related to memory operations, such as a data input/output circuit or an input/output interface. The control logic 121 may output various internal control signals for programming data into the memory cell array 125 or reading data from the memory cell array 125 based on the command CMD, address ADDR, and control signal CTRL received from the memory controller 110. For example, the control logic 121 may output a voltage control signal CTRL_vol for controlling the levels of various voltages generated by the voltage generator 123. The control logic 121 may provide the row address X-ADDR to the row decoder 124 and may provide the column address Y-ADDR to the page buffer circuit 126. The control logic 121 may receive the read voltage correction signal ORS from the memory controller 110, and based on this, the control logic 121 may control the voltage generator 123 so that the memory device 120 performs a read operation based on the corrected read voltage level.

The control logic 121 may receive the cell count value CNTV from the cell counter 127. The control logic 121 may be configured to store valley search information VSINF corresponding to a result of the valley search operation. The control logic 121 may output the valley search information VSINF to the memory controller 110.

The control logic 121 may perform a valley search operation on threshold voltage distribution of memory cells. The control logic 121 may control the page buffer circuit 126 and the voltage generator 123 for a valley search operation.

According to an embodiment, one or more distribution valleys may exist on the threshold voltage distribution. In this case, the valley search information VSINF generated through the valley search operation may include information about all distribution valleys present in the threshold voltage distribution of memory cells. For example, when memory cells included in the memory cell array 125 correspond to TLCs, the threshold voltage distribution when the memory device 120 performs various operations may have first to eighth states, that is, a total of 8 states. However, the disclosure is not limited to the memory cells included in the memory cell array 125 corresponding to TLCs. Also, the threshold voltage distribution may have a number of states different than 8.

At this time, one distribution valley may exist for every two adjacent states in the above 8 states. Therefore, when the memory cells are TLCs, a total of 7 distribution valleys may exist, and the valley search information VSINF may include cell count values corresponding to each distribution valley and similarly, may include valley voltage levels corresponding to each distribution valley.

To identify a specific state of selected memory cells from the memory cell array 125, the control logic 121 may control the page buffer circuit 126 to perform a plurality of sensing operations. Also, the control logic 121 may control a plurality of page buffers PB to store sensing data corresponding to each of a plurality of sensing results in a plurality of latch sets provided in each of the plurality of page buffers PB.

The voltage generator 123 may generate various voltages used in the memory device 120, and for example, the voltage generator 123 may generate a program voltage, a read voltage, a program verify voltage, an erase voltage, and the like as the word line voltage VWL.

The row decoder 124 may selection at least one of word lines of the selected memory block in response to the row address X-ADDR.

The memory cell array 125 includes a plurality of memory cells and may be connected to word lines WL, string selection lines SSL, ground selection lines GSL, and bit lines BL. The memory cell array 125 may be connected to the row decoder 124 through word lines WL, string selection lines SSL, and ground selection lines GSL, and may be connected to the page buffer 150 through the bit lines BL.

For example, the plurality of memory cells included in the memory cell array 125 may be non-volatile memory cells that retain stored data even when power thereto is cut off. Specifically, when the memory cell is a non-volatile memory cell, the memory device 120 may be Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), or Ferroelectric Random Access Memory (FRAM). Hereinafter, embodiments will be described taking a case in which a plurality of memory cells are NAND flash memory cells as an example, but it will be understood that the technical spirit of the inventive concept is not limited thereto.

The memory cell array 125 includes a plurality of memory blocks BLK1 to BLKz, and each the memory blocks BLK1 to BLKz, may have a planar structure or a three-dimensional structure. The memory cell array 125 may include at least one of a single level cell block including single level cells (SLCs), a multi-level cell block including multi-level cells (MLCs), a triple level cell block including TLCs, and a quad level cell block including quad level cells. For example, some memory blocks among the plurality of memory blocks BLK1 to BLKz may be SLC blocks, and other memory blocks may be MLC blocks, TLC blocks, or quad-level cell blocks.

The page buffer circuit 126 may operate in response to control of the control logic 121. For example, the page buffer circuit 126 may operate as a write driver or a sense amplifier. According to an embodiment, during a program operation, the page buffer circuit 126 may operate as a write driver and apply a voltage according to data DATA to be stored in the memory cell array 125 to the bit lines BL. According to an embodiment, during a read operation, the page buffer circuit 126 may operate as a sense amplifier to sense data DATA stored in the memory cell array 125. Each of the plurality of page buffers PB included in the page buffer circuit 126 may be connected to at least one bit line.

Each of the plurality of page buffers PB may perform a plurality of sensing operations to identify any one state stored in the selected memory cells under the control of the control logic 121. Also, after each of the plurality of page buffers PB stores data sensed through a plurality of sensing operations, one piece of data may be selected under the control of the control logic 121. That is, each of the plurality of page buffers PB may perform sensing multiple times to identify any one state. Also, each of the plurality of page buffers may select or output all or some pieces of sensed data according to the control of the control logic 121.

The cell counter 127 may be implemented to count memory cells corresponding to a certain threshold voltage region from data sensed by the page buffer circuit 126. For example, the cell counter 127 may count the number of memory cells corresponding to a specific threshold voltage region by processing data sensed by each of a plurality of page buffers. The cell counter 127 may provide the counted cell count value CNTV to the control logic 121. According to an embodiment, the cell counter 127 may count the number of memory cells belonging to a threshold voltage region within a range based on the distribution valley, corresponding to each distribution valley detected through the valley search operation of the control logic 121. The range maybe a preset or predetermined range.

The I/O buffer 128 may temporarily store a command CMD, an address ADDR, and data DATA provided from the outside of the memory device 120 through an input/output line. The I/O buffer 128 may temporarily store read data of the memory device 120 and output the read data to the outside through an input/output line at a designated time point.

Figure 4:
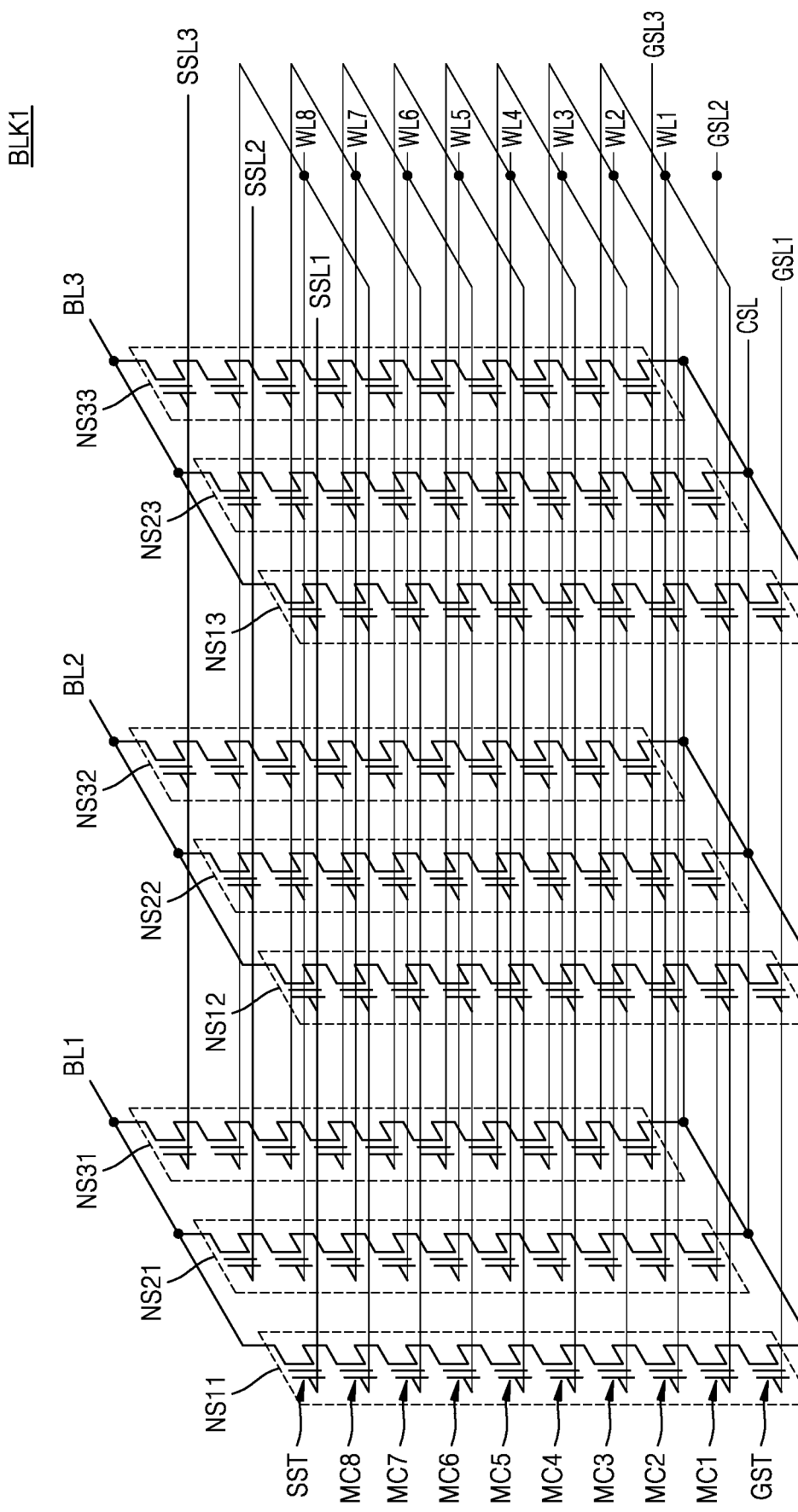
FIG. 4 is a circuit diagram showing an equivalent circuit of a first memory block of FIG. 3.

FIG. 4 is a circuit diagram showing an equivalent circuit of the first memory block BLK1 of FIG. 3. FIG. 4 may be described with reference to FIG. 3, and redundant description may be omitted.

Referring to FIG. 4, the first memory block BLK1 may be a NAND flash memory having a vertical structure, and each of the memory blocks BLK1 to BLKz shown in FIG. 3 may be implemented as shown in FIG. 4. The first memory block BLK1 may include a plurality of NAND cell strings NS11 to NS33, a plurality of word lines WL1 to WL8, a plurality of bit lines BL1 to BL3, a plurality of ground selection lines GSL1 to GSL3, a plurality of string selection lines SSL1 to SSL3, and a common source line CSL. Here, the number of NAND cell strings, the number of word lines, the number of bit lines, the number of ground selection lines, and the number of string selection lines may be variously changed according to embodiments.

The NAND cell strings NS11, NS21, and NS31 may be provided between the first bit line BL1 and the common source line CSL, the NAND strings NS12, NS22, and NS32 may be provided between the second bit line BL2 and the common source line CSL, and the NAND strings NS13, NS23, and NS33 may be provided between the third bit line BL3 and the common source line CSL. Each NAND cell string (e.g., NS11) may include a string selection transistor SST, a plurality of memory cells MC1 to MC8, and a ground selection transistor GST connected in series.

The NAND cell strings commonly connected to one bit line may constitute one column. For example, the NAND cell strings NS11, NS21, and NS31 commonly connected to the first bit line BL1 may correspond to the first column, the NAND cell strings NS12, NS22, and NS32 commonly connected to the second bit line BL2 may correspond to the second column, and the NAND cell strings NS13, NS23, and NS33 commonly connected to the third bit line BL3 may correspond to the third column.

The NAND cell strings connected to one string selection line may constitute one row. For example, the NAND cell strings NS11, NS12, and NS13 connected to the first string selection line SSL1 may correspond to the first row, the NAND cell strings NS21, NS22, and NS23 connected to the second string selection line SSL2 may correspond to the second row, and the NAND cell strings NS31, NS32, and NS33 connected to the third string selection line SSL3 may correspond to the third row.

The string selection transistor SST may be connected to corresponding string selection lines SSL1 to SSL3. The plurality of memory cells MC1 to MC8 may be connected to corresponding word lines WL1 to WL8, respectively. The ground selection transistors GST may be connected to corresponding ground selection lines GSL1 to GSL3, and the string selection transistors SST may be connected to corresponding bit lines BL1 to BL3. The ground selection transistor GST may be connected to the common source line CSL.

In this embodiment, word lines (e.g., WL1) of the same height are commonly connected to each other, the string selection lines SSL1 to SSL3 are separated from each other, and the ground selection lines GSL1 to GSL3 are also separated from each other. For example, when programming memory cells included in the NAND cell strings NS11, NS12, and NS13 connected to the first word line WL1 and corresponding to the first column, the first word line WL1 and the first string selection line SSL1 are selected. However, the inventive concept is not limited thereto, and in another embodiment, the ground selection lines GSL1 to GSL3 may be connected in common.

Figure 5:
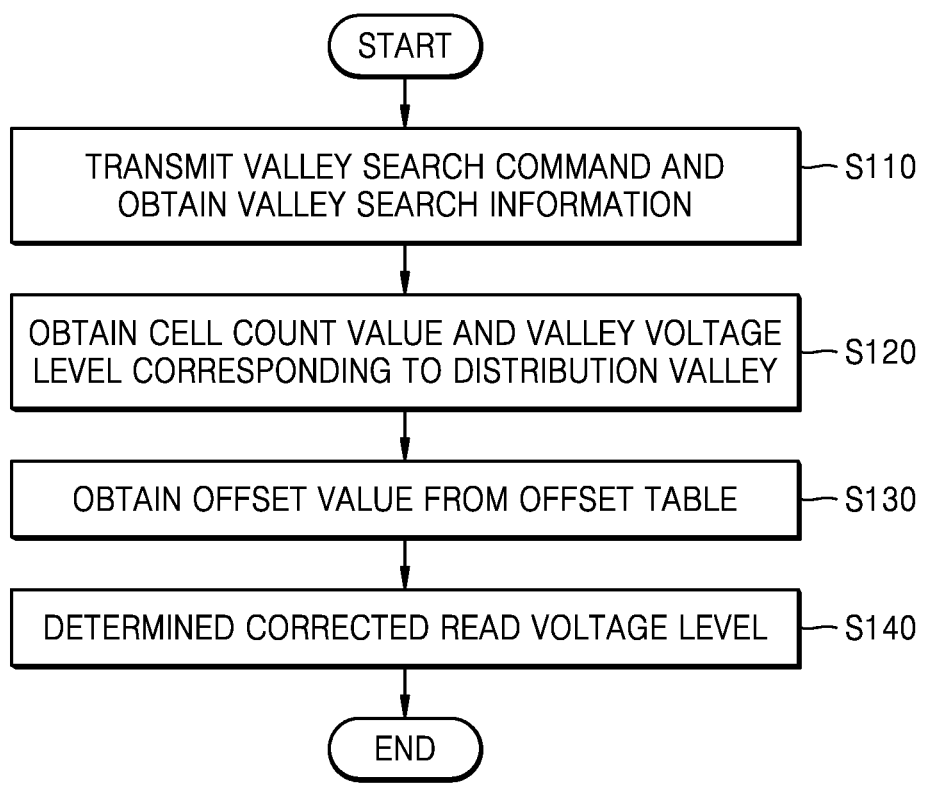
FIG. 5 is a flowchart illustrating a method of operating a memory controller, according to an embodiment.

FIG. 5 is a flowchart illustrating an operating method of the memory controller 110, according to an embodiment. FIG. 5 may be described with reference to FIGS. 1 to 3, and redundant descriptions may be omitted.

In operation S110, the memory controller 110 may transmit a valley search command for threshold voltage distribution of memory cells to the memory device 120. The memory device 120 may perform a valley search operation based on the valley search command transmitted by the memory controller 110. For example, the memory device 120 may perform a valley search operation in response to the valley search command transmitted by the memory controller 110 and generate valley search information VSINF corresponding to the valley search operation. The memory controller 110 may receive valley search information VSINF from the memory device 120. According to an embodiment, the valley search command may be, but is not limited to, a command included in a read retry command transmitted when error correction fails.

According to an embodiment, the memory controller 110 may transmit a read command to the memory device 120. The memory device 120 may provide read data to the memory controller 110 according to a read command. The memory controller 110 may perform an error correction operation on data acquired from the memory device 120 through the ECC engine 114. At this time, failure of the error correction operation may mean that correction of the read voltage is required. Accordingly, when the error correction operation fails, the memory controller 110 may perform a series of operations for correcting the read voltage by transmitting a valley search command to the memory device 120.

In operation S120, the memory controller 110 may obtain a cell count value and a valley voltage level corresponding to a distribution valley from the valley search information VSINF obtained in operation S110.

In operation S130, the memory controller 110 may determine an offset value by searching the offset table 116.

According to an embodiment, the memory controller 110 may search the offset table 116 for the offset value based on the valley voltage level and the cell count value obtained in operation S120. That is, by searching and identifying a state the valley voltage level corresponds to on the threshold voltage distribution of memory cells and searching and identifying a cell count section to which the cell count value belongs, an offset value corresponding to the identified state and the identified cell count section may be determined as the offset value. For example, if the valley voltage level is the voltage level for reading in a first state and the cell count value belongs to a first cell count section, the memory controller 110 may determine an offset value such that a first offset value satisfying both information of the first state and the first cell count section on the offset table 116 becomes an offset value for correcting the valley voltage level.

In operation S140, the memory controller 110 may generate a read voltage based on the offset value determined in operation S130. For example, the memory controller 110 may correct or modify the read voltage based on the offset value determined in operation S130. For example, the read voltage may be corrected by adding the offset value determined in operation S130 to the valley voltage level obtained in operation S120.

Figure 6:
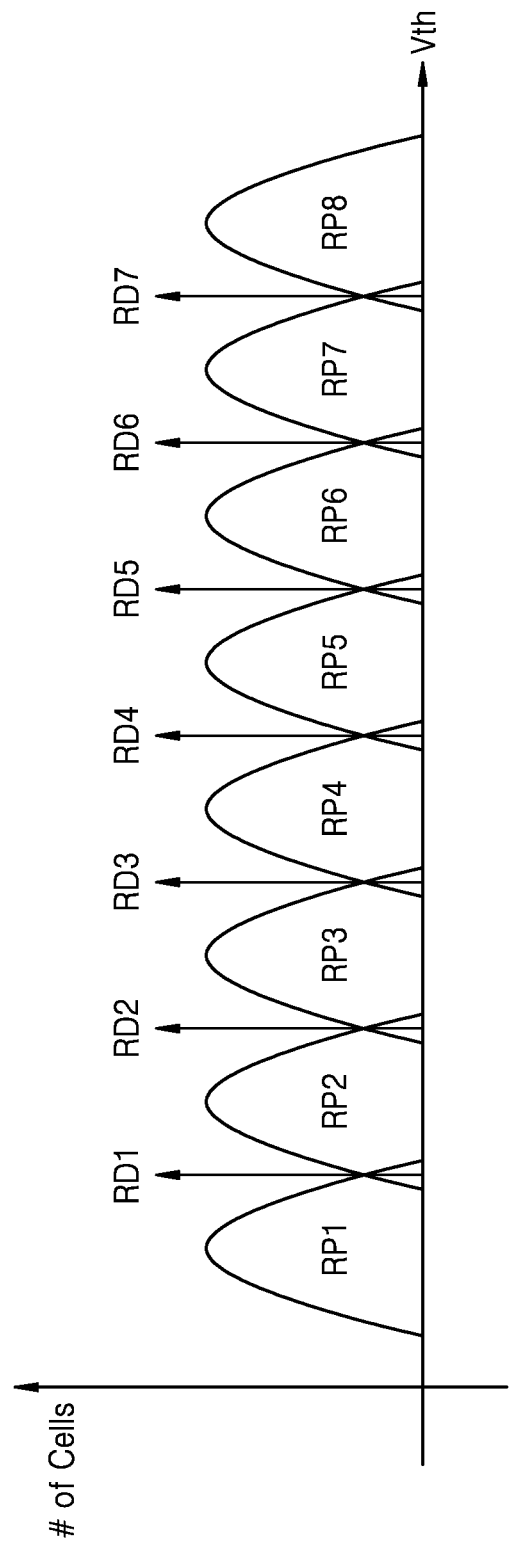
FIG. 6 is a diagram illustrating distribution of threshold voltages of memory cells according to an embodiment.

FIG. 6 is a diagram illustrating distribution of threshold voltages of memory cells according to an embodiment. FIG. 6 may be described with reference to FIG. 3, and redundant description may be omitted.

The graph of FIG. 6 shows distributions of threshold voltages of memory cells connected to word lines, respectively. The horizontal axis may represent threshold voltages Vth of memory cells, and the vertical axis may represent cell counts, that is, the number of memory cells. Referring to FIG. 3, a word line may be included in one block of the memory device 120. One or more bits may be programmed into a memory cell connected to a word line. According to the number of bits stored in the memory cell, the memory cell may be classified into an SLC, an MLC, a TLC, a quad level cell (QLC), and the like. Memory cells may respectively correspond to a plurality of states according to the number of bits stored in the memory cell. Each of the plurality of states may be defined as a threshold voltage range. In FIG. 6, it is assumed that the memory cell is a TLC. In this case, the threshold voltages of each of the memory cells may form a plurality of threshold voltage distribution levels, and the formed threshold voltage distribution levels may be divided into 8 states RP1 to RP8.

After data is written to the memory cell, disturbance degradation or retention degradation may occur in the memory cell. Disturbance deterioration refers to a phenomenon in which threshold voltages of memory cells change due to programming, reading, erasing, coupling, and the like occurring around memory cells. Retention deterioration refers to a phenomenon in which a threshold voltage of a memory cell changes as time elapses after charges are captured in a charge trapping layer of a memory cell and the memory cell is programmed. When degradation occurs in a memory cell, the threshold voltage of the memory cell moves, data of the memory cell may not be read using initially set read levels (e.g., a threshold voltage may be changed as shown in the graph of FIG. 7B).

When the memory cells exhibit a threshold voltage distribution as shown in the graph of FIG. 6, optimum read voltage levels for reading data stored in the memory cells may be RD1 to RD7. However, if the memory cells deteriorate, this graph may change to an asymmetrical shape. According to an embodiment, the control logic 121 may calculate optimum read voltage levels RD1 to RD7 for determining the states RP1 to RP8 based on the deterioration state of the block corresponding to the graph and the number of words line WL.

Figure 7A:
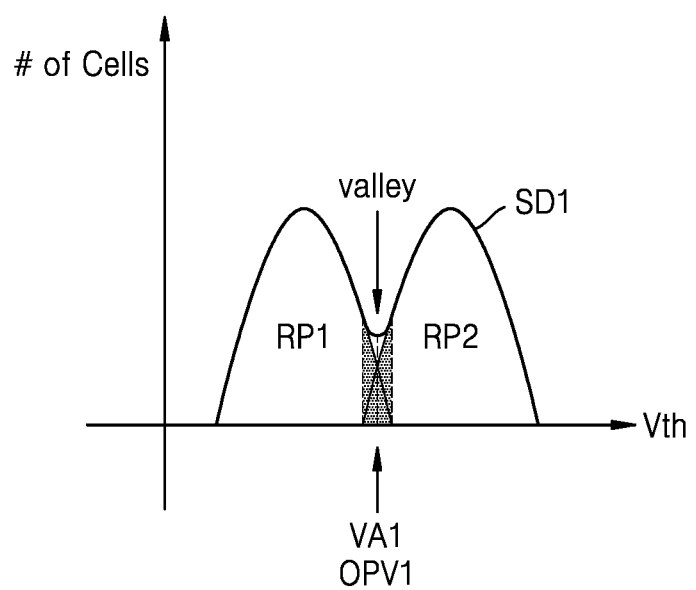
FIGS. 7A and 7B are diagrams illustrating distribution of threshold voltages of memory cells according to embodiments.
Figure 7B:
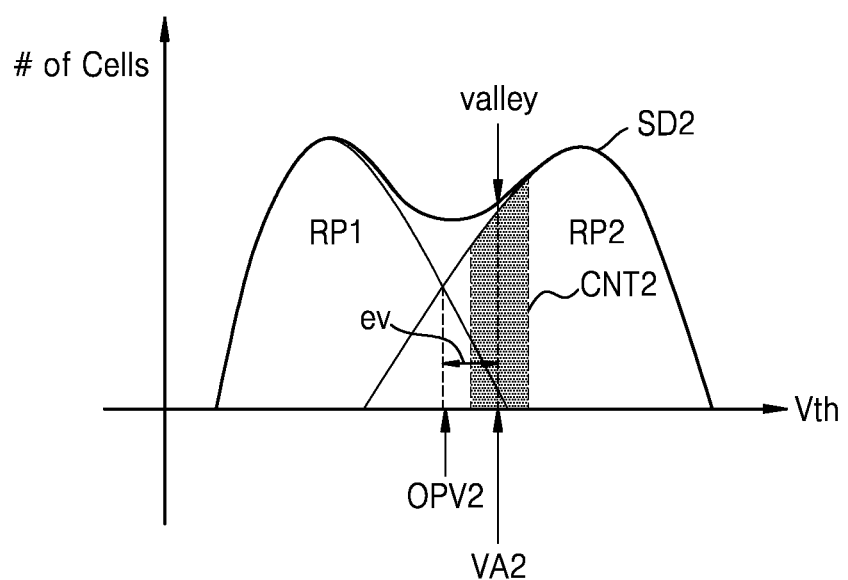

FIGS. 7A and 7B are diagrams illustrating distribution of threshold voltages of memory cells according to embodiments. Specifically, FIG. 7A may represent a threshold voltage distribution before degradation of memory cells and FIG. 7B may represent a threshold voltage distribution after degradation of memory cells. FIGS. 7A to 7B may be described with reference to FIGS. 1 to 3, and repeated descriptions therebetween may be omitted.

In the threshold voltage distribution illustrated in FIGS. 7A and 7B, the horizontal axis may represent threshold voltages Vth of memory cells, and the vertical axis may represent cell counts, that is, the number of memory cells. The threshold voltage distribution shown in FIGS. 7A and 7B may show two adjacent threshold voltage distribution levels selected from the threshold voltage distribution of FIG. 6. For example, the threshold voltage distribution of FIG. 6 may indicate threshold voltage distribution levels corresponding to the first state RP1 and the second state RP2. Hereinafter, examples of the first state RP1 and the second state RP2 to describe the correction of the valley voltage level are only examples. Of course, other adjacent states may also correct the valley voltage level by the same principle.

The threshold voltage distribution of FIG. 7A may mean that memory cells are do not deteriorate and form a symmetrical distribution. The threshold voltage distribution of FIG. 7B may mean that an asymmetric distribution is formed as memory cells deteriorate.

Referring to FIG. 7A, the sum distribution SD1 may be the sum of the first state RP1 and the second state RP2. The first sum distribution SD1 may be modeled as a probability density function, and a distribution valley of the first sum distribution SD1 may refer to a part of the probability density function corresponding to the first sum distribution SD1. The threshold voltage corresponding to the distribution valley of the first sum distribution SD1 may be the first valley voltage level VA1, and the cell count value corresponding to the distribution valley of the first sum distribution SD1 may be the first cell count value CNT1, which may refer to cells belonging to a certain area based on the first valley voltage level VA1.

When threshold voltage distribution of memory cells forms a symmetrical distribution as shown in FIG. 7A, a threshold voltage level corresponding to this distribution valley may be an optimal read voltage level OPV1. That is, the optimal read voltage level OPV1 may match the first valley voltage level VA1. Therefore, when the threshold voltage distribution of memory cells forms a symmetrical distribution, the read operation may be performed according to the valley voltage level, and correction according to a separate offset value may not be performed.

Referring to FIG. 7B, the second sum distribution SD2 may be the sum of the first state RP1 and the second state RP2 as in FIG. 7A. The second sum distribution SD2 may be modeled as a probability density function, and the distribution valley of the second sum distribution SD2 may refer to a part detected in the probability density function corresponding to the second sum distribution SD2. The threshold voltage corresponding to the distribution valley of the second sum distribution SD2 may be the second valley voltage level VA2, and the cell count value corresponding to the distribution valley of the second sum distribution SD2 may be the second cell count value CNT2, which may refer to cells belonging to a certain area based on the second valley voltage level VA2.

When threshold voltage distributions of memory cells form an asymmetrical distribution as shown in FIG. 7B, the threshold voltage level corresponding to the distribution valley may not be the optimal read voltage level OPV2. That is, the optimal read voltage level OPV2 may not coincide with the second valley voltage level VA2, and for example, a difference by the first error (ev) may occur. In this case, when the read operation is performed according to the second valley voltage level VA2, an incorrect value may be read. For example, the second valley voltage level VA2 is a voltage for reading data corresponding to the first state RP1, but as the threshold voltage distribution is formed asymmetrically, data corresponding to the second state RP2 may be read out. Accordingly, when the threshold voltage distribution forms an asymmetrical distribution, it is necessary to correct the valley voltage level. In this case, a value correcting the difference by the first error (ev) may be an offset value, and such an offset value may be determined from an offset table based on the valley voltage level and the cell count value.

Figure 8A:
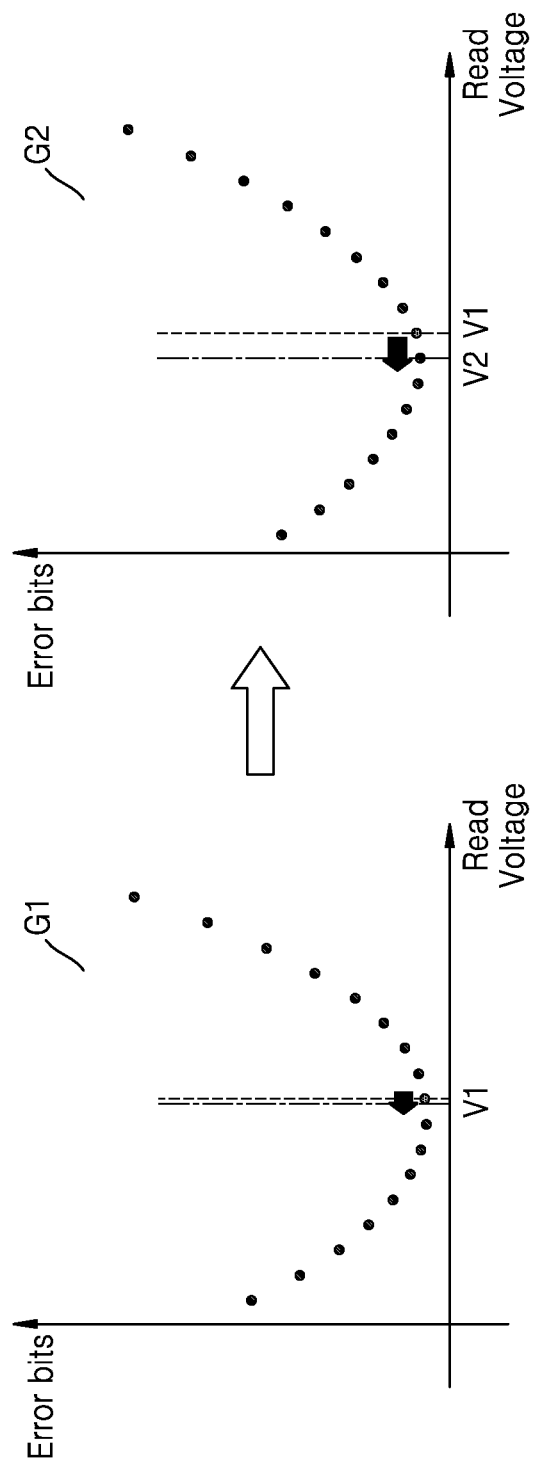
FIGS. 8A and 8B are diagrams illustrating distribution of threshold voltages of memory cells according to embodiments.
Figure 8B:
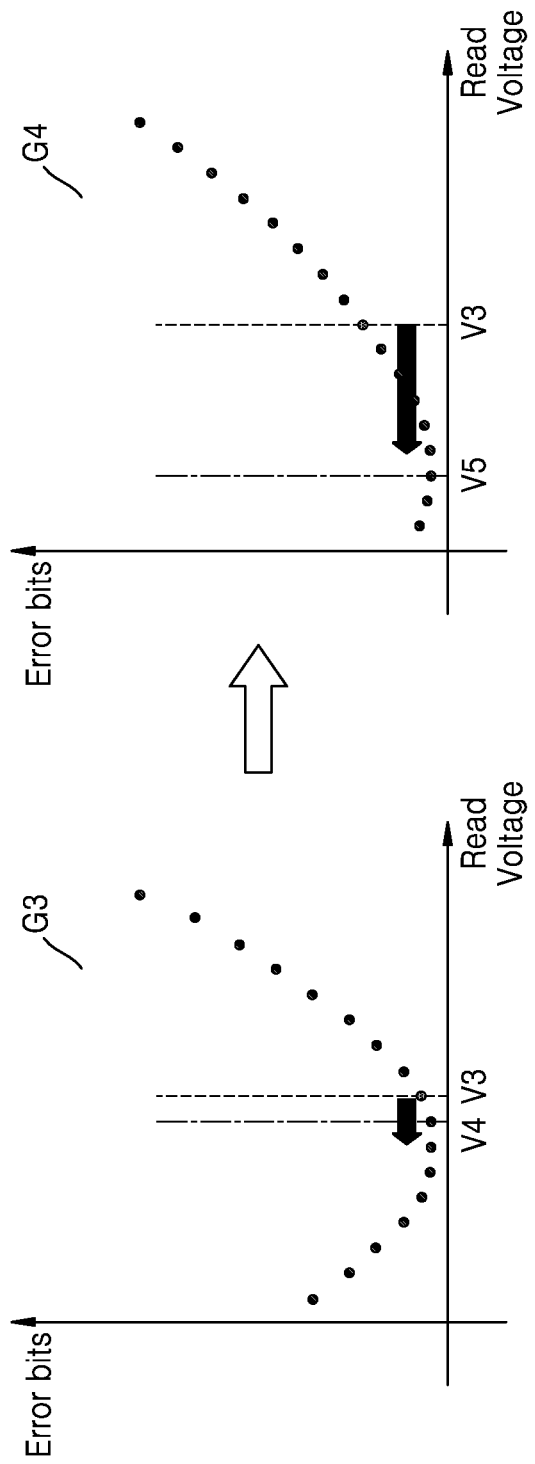

FIGS. 8A and 8B are diagrams illustrating distribution of threshold voltages of memory cells according to embodiments. Specifically, the distribution of threshold voltages for memory cells may be classified according to a plurality of states as shown in FIG. 6, and the offset value may have a different value according to each state. FIGS. 8A to 8B may be described with reference to FIG. 6, and repeated descriptions therebetween may be omitted.

The horizontal axis of the first graph G1 and the second graph G2 in FIG. 8A and the third graph G3 and the fourth graph G4 in FIG. 8B may refer to a read voltage level, and the vertical axis may refer to an error bit. For convenience of description, it is assumed in FIGS. 8A and 8B that the memory cell is a TLC and the threshold voltage of the memory cell may be programmed to one of 8 states RP1 to RP8. In addition, the first graph G1 and the second graph G2 are described by taking the third state RP3 as an example, and the third graph G3 and the fourth graph G4 are described by taking the seventh state RP7 as an example.

According to an embodiment, the offset value may be negative. In this case, in the first state RP1 to the eighth state RP8, a smaller offset value may be required to correct the valley voltage level for the state corresponding to the higher threshold voltage. For example, a third offset value required to determine an optimal read voltage level for the seventh state RP7 may be smaller than the first offset value required to determine the optimal read voltage level for the third state RP3. In other words, if the offset value is a negative number, the absolute value of the third offset value may be greater than the absolute value of the first offset value. Setting the offset value in this way may reflect the fact that the error between the valley voltage level corresponding to the seventh state RP7 and the optimum read voltage level is greater than the error between the valley voltage level corresponding to the third state RP3 and the optimum read voltage level if the memory cells are degraded. It is an example that the offset value is a negative number, and the offset value may be a positive number or 0 depending on the degree of deterioration of the memory cells or the state of the threshold voltage.

The first graph G1 is a graph showing error bits corresponding to the application of a read voltage corresponding to the third state RP3 to read the third state RP3 when the memory cells do not deteriorate. When the memory cells do not deteriorate as shown in the first graph G1, the optimal read voltage level for reading the third state RP3 may be the first voltage V1, and the valley voltage level found through the valley search operation may also be the first voltage V1. That is, the optimal read voltage level may coincide with the valley voltage level.

The second graph G2 is a graph showing error bits corresponding to the application of a read voltage corresponding to the third state RP3 to read the third state RP3 when the memory cells deteriorate. When the memory cells deteriorate as shown in the second graph G2, an optimal read voltage level for reading the third state RP3 may be the second voltage V2, and the valley voltage level found through the valley search operation may be the first voltage V1. That is, the optimal read voltage level may not match the valley voltage level. In this case, the first voltage V1 may be corrected to be the second voltage V2 or a value close to the second voltage V2 through the offset value. According to an embodiment, if the read voltage is corrected by adding the first offset value to the first voltage V1, the corrected read voltage level may become an optimal read voltage level.

A third graph G3 is a graph showing error bits corresponding to the application of a read voltage corresponding to the seventh state RP7 to read the seventh state RP7 when the memory cells do not deteriorate. When the memory cells do not deteriorate as shown in the third graph G3, the optimum read voltage level for reading the seventh state RP7 may be the fourth voltage V4, and the valley voltage level found through the valley search operation may be the third voltage V3. That is, the optimal read voltage level may not match the valley voltage level. In this case, the third voltage V3 may be corrected to be the fourth voltage V4 or a value close to the fourth voltage V4 through the offset value. According to an embodiment, if the read voltage is corrected by adding the second offset value to the third voltage V3, the corrected read voltage level may become an optimal read voltage level.

A fourth graph G4 is a graph showing error bits corresponding to the application of a read voltage level corresponding to the third state RP7 to read the seventh state RP7 when the memory cells deteriorate. When the memory cells deteriorate as shown in the fourth graph G4, the optimal read voltage level for reading the seventh state RP7 may be the fifth voltage V5, and the valley voltage level found through the valley search operation may be the third voltage V3. That is, the optimal read voltage level may not match the valley voltage level. In this case, the third voltage V3 may be corrected to be the fifth voltage V5 or a value close to the fifth voltage V5 through the offset value. According to an embodiment, if the read voltage is corrected by adding the third offset value to the fifth voltage V5, the corrected read voltage level may become an optimal read voltage level.

In FIGS. 8A and 8B, the offset values are illustrated as negative voltages (or negative values), as such, adding the offset values to the valley voltage level reduces the read voltage level. However, the disclosure is not limited thereto, and as such, according to another embodiment, the offset values may be represented by positive voltages (or positive values). According to an embodiment, in a case that the offset values is a positive voltage (or a positive value), the read voltage is corrected by subtracting the offset value from the valley voltage level.

FIG. 9 is a diagram for explaining an offset table 116 according to an embodiment. FIG. 9 may be described with reference to FIGS. 1, 2, and 6, and redundant descriptions may be omitted.

The offset table 116 may include a plurality of offset values necessary for the read voltage calibration module 115 to correct the read voltage of the memory device 120. A plurality of offset values stored in the offset table 116 may be divided into two variables and previously input to the memory controller 110. In FIG. 9, the offset table 116 is shown including a total of 14 offset values from the first offset value ORV1 to the 14th offset value ORV14, but this is an example, and more or less offset values may be included depending on the number of states of memory cells and the number of cell count sections corresponding to the distribution of threshold voltages of memory cells.

A first variable for classifying a plurality of offset values included in the offset table 116 may be a variable indicating a logical state of memory cells (i.e., a state representing a value stored in the memory cells) on the threshold voltage distribution of memory cells. That is, the first variable may be a variable representing a first state to an Nth state (N is a natural number greater than 1). For example, if the memory cells are configured with a TLC, N may be 8, and states corresponding to the threshold voltage distribution of the memory cells may be the first state RP1 to the eighth state RP8. Hereinafter, it is assumed that the memory cells are configured with a TLC.

According to an embodiment, since the eighth state RP8 (see FIG. 6) corresponds to the highest threshold voltage distribution, a distribution valley with a state having a higher threshold voltage than the eighth state RP8 may not exist. In addition, in general, in reading the eighth state RP8, the read voltage may be read by applying the highest read voltage within a voltage window range in which threshold voltage distributions may be arranged, and correcting this read voltage may not be necessary. Therefore, the offset value for the eighth state RP8 may not be included in the offset table 116. However, as shown in FIG. 9, it is an example that there may be no offset value for the eighth state RP8, and of course, offset values corresponding to the eighth state RP8 may be separately defined and included in the offset table 116.

The offset values may be classified and stored according to which of the first state RP1 to the seventh state RP7 corresponds to the valley voltage level. For example, when the valley voltage level corresponds to the read voltage for the first state, the offset value may correspond to either the first offset value ORV1 or the second offset value ORV2.

Therefore, assuming that the offset values are negative voltages, as shown in FIGS. 8A and 8B, the error may increase as the valley voltage level corresponds to a higher threshold voltage level. Accordingly, the offset table 116 may be configured such that a smaller offset value may be determined as a correction value in a state corresponding to a higher threshold voltage level.

According to an embodiment, offset values acquired by the read voltage calibration module 115 through the offset table 116 may have the following relationship, and the offset table 116 may be constructed taking this into account. When the valley voltage level corresponds to a first state among a plurality of states respectively representing values stored in memory cells on the threshold voltage distribution of memory cells, the read voltage calibration module 115 may determine the first offset value as an offset value. On the other hand, when the valley voltage level corresponds to a state (e.g., the second state) having a higher threshold voltage level than the first state, the read voltage calibration module 115 may determine a value smaller than the first offset value as the offset value. However, the disclosure is not limited thereto, and as such, the offset table 116 may be configured or constructed in a different manner.

The second variable for classifying the plurality of offset values included in the offset table 116 may be a variable for distinguishing which cell count section the cell count value is included in. According to an embodiment, the offset table 116 may include a plurality of cell count sections. In the case of FIG. 9, the offset table 116 is illustrated as having two cell count sections according to the logical states of memory cells, but this is exemplary, and the offset table 116 may be configured to have a different number of cell count sections for each cell. For example, the cell count section corresponding to the first state RP1 may be divided into three cell count sections, and the cell count section corresponding to the fifth state RP5 may be divided into two cell count sections.

When the cell count value obtained from the valley search information is large, an error between the valley voltage level and the optimal read voltage may also be large. In other words, assuming that the offset value is a negative number, a smaller offset value may be required as the cell count value obtained from the valley search information increases. However, since there is a physical limitation in defining all offset values corresponding to all cell count values, the offset value may be determined according to the cell count section to which the cell count values belong. For example, taking the third state RP3 as an example, an offset value corresponding to the third state RP3 may be selected from the fifth offset value ORV5 and the sixth offset value ORV6. At this time, since the sixth offset value ORV6 is an offset value corresponding to larger cell count values than the fifth offset value ORV5, the sixth offset value ORV6 may be configured to be smaller than the fifth offset value ORV5.

According to an embodiment, offset values acquired by the read voltage calibration module 115 through the offset table 116 may have the following relationship, and the offset table 116 may be constructed taking this into account. The read voltage calibration module 115 may search for logical state information corresponding to the read voltage level according to the read voltage level included in the valley search information. After searching for logical state information, according to the cell count value included in the valley search information, when the cell count value is included in the first cell count section among the cell count sections corresponding to the found state, the read voltage calibration module 115 may determine an offset value (e.g., the first offset value ORV1) corresponding thereto as the offset value.

Similarly, when the cell count value is included in the second cell count section among the cell count sections corresponding to the found state, an offset value corresponding thereto (e.g., the second offset value ORV2) may be determined as the offset value. At this time, since the cell count value when included in the second cell count section is greater than the cell count value when included in the first cell count section, the second offset value ORV2 may be smaller than the first offset value ORV1.

Figure 10:
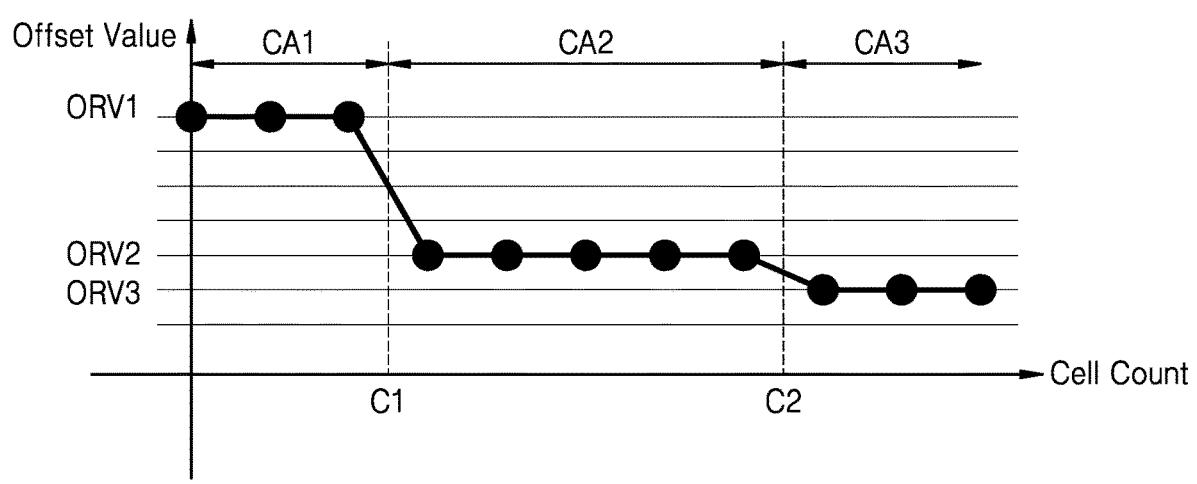
FIG. 10 is a graph for explaining a relationship between a cell count value and an offset value according to an embodiment.

FIG. 10 is a graph for explaining a relationship between a cell count value and an offset value according to an embodiment. FIG. 10 may be described with reference to FIGS. 1 to 3 and 6, and redundant descriptions may be omitted.

The graph of FIG. 10 may be a diagram for explaining that, in constructing the offset table 116, the offset value decreases as the cell count value increases. In FIG. 10, it is assumed that the valley voltage level obtained through the valley search information corresponds to the fifth state RP5. Taking the fifth state RP5 as an example is just an example, and other states may be described with the same logic, of course.

According to an embodiment, a cell count section corresponding to a case where the cell count value obtained through the valley search information is smaller than the first value C1 may be the first cell count section CA1. When the cell count value obtained through the valley search information is greater than the first value C1 and equal to or less than the second value C2, the corresponding cell count section may be the second cell count section CA2. When the cell count value obtained through the valley search information is greater than the second value C2, the corresponding cell count section may be the third cell count section CA3.

According to an embodiment, when the cell count value belongs to the first cell count section CA1, the offset value may be determined as the first offset value ORV1. In this case, the first offset value ORV1 may be 0V or may refer to a voltage smaller than 0V, that is, a negative voltage.

According to an embodiment, when the cell count value belongs to the second cell count section CA2, the offset value may be determined as the second offset value ORV2. In this case, the second offset value ORV2 may be smaller than the first offset value ORV1.

According to an embodiment, when the cell count value belongs to the third cell count section CA3, the offset value may be determined as the third offset value ORV3. In this case, the third offset value ORV3 may be smaller than the second offset value ORV2.

Figure 11:
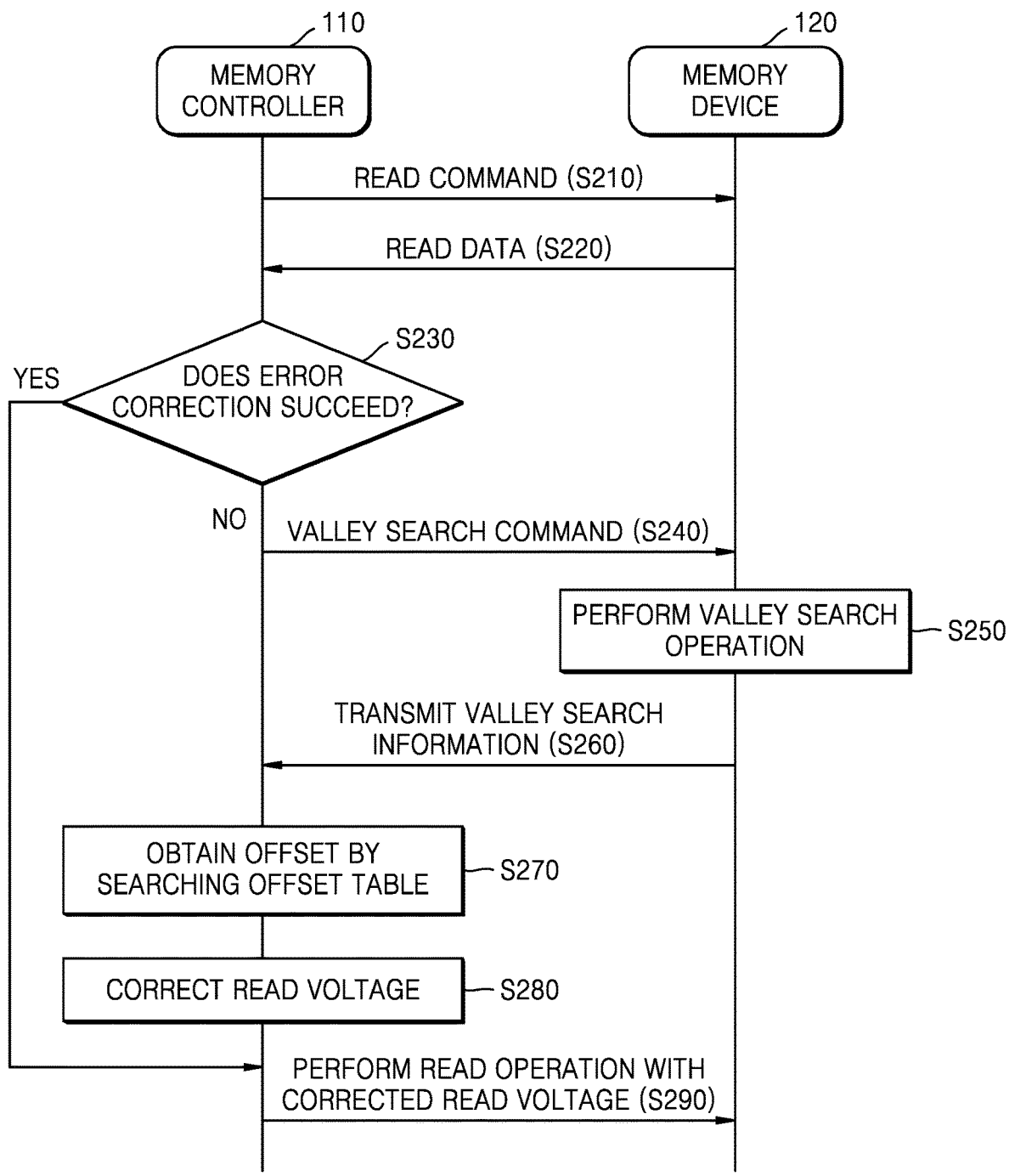
FIG. 11 is a diagram illustrating a method of correcting a read voltage according to an embodiment over time.

FIG. 11 is a diagram illustrating a method of correcting a read voltage according to an embodiment. FIG. 11 may be described with reference to FIGS. 1 to 3 and 5, and redundant descriptions may be omitted.

Referring to FIG. 10, in operation S210, the memory controller 110 may transmit a read command for reading data to the memory device 120.

In operation S220, the memory device 120 may transmit data to the memory controller 110 in response to the read command according to operation S210.

In operation S230, the memory controller 110 may perform an error correction operation based on the data received from the memory device 120. If the error correction operation is successful, operation S290 may be performed without correcting the read voltage according to operations S240 to S280.

In operation S240, if the error correction operation in operation S230 fails, the memory controller 110 may determine that correction of the read voltage is necessary and may determine correction of the read voltage. Accordingly, the memory controller 110 may transmit the valley search command to the memory device 120.

In operation S250, the memory device 120 having received the valley search command in operation S240 may perform a valley search operation in response to the valley search command. The memory device 120 may generate valley search information including a cell count value and a valley voltage level obtained according to the valley search operation.

In operation S260, the memory device 120 may transmit the valley search information generated in operation S250 to the memory controller 110.

In operation S270, the memory controller 110 may obtain a cell count value and a valley voltage level from the valley search information received in operation S260. The memory controller 110 may search the offset table 116 for the offset value based on the obtained cell count value and valley voltage level. The memory controller 110 may determine an offset value according to a search result of the offset table 116.

In operation S280, the memory controller 110 may determine a corrected read voltage level by correcting the valley voltage level based on the offset value determined as a result of searching the offset table 116 in operation S270.

In operation S290, the memory controller 110 transmits the read voltage correction signal ORS to the memory device 120, and controls the memory device 120 to allow the memory device 120 to perform a read operation according to the corrected read voltage level determined in operation S280. According to an embodiment, information about the corrected read voltage level may be included in the read voltage correction signal ORS.

Figure 12:
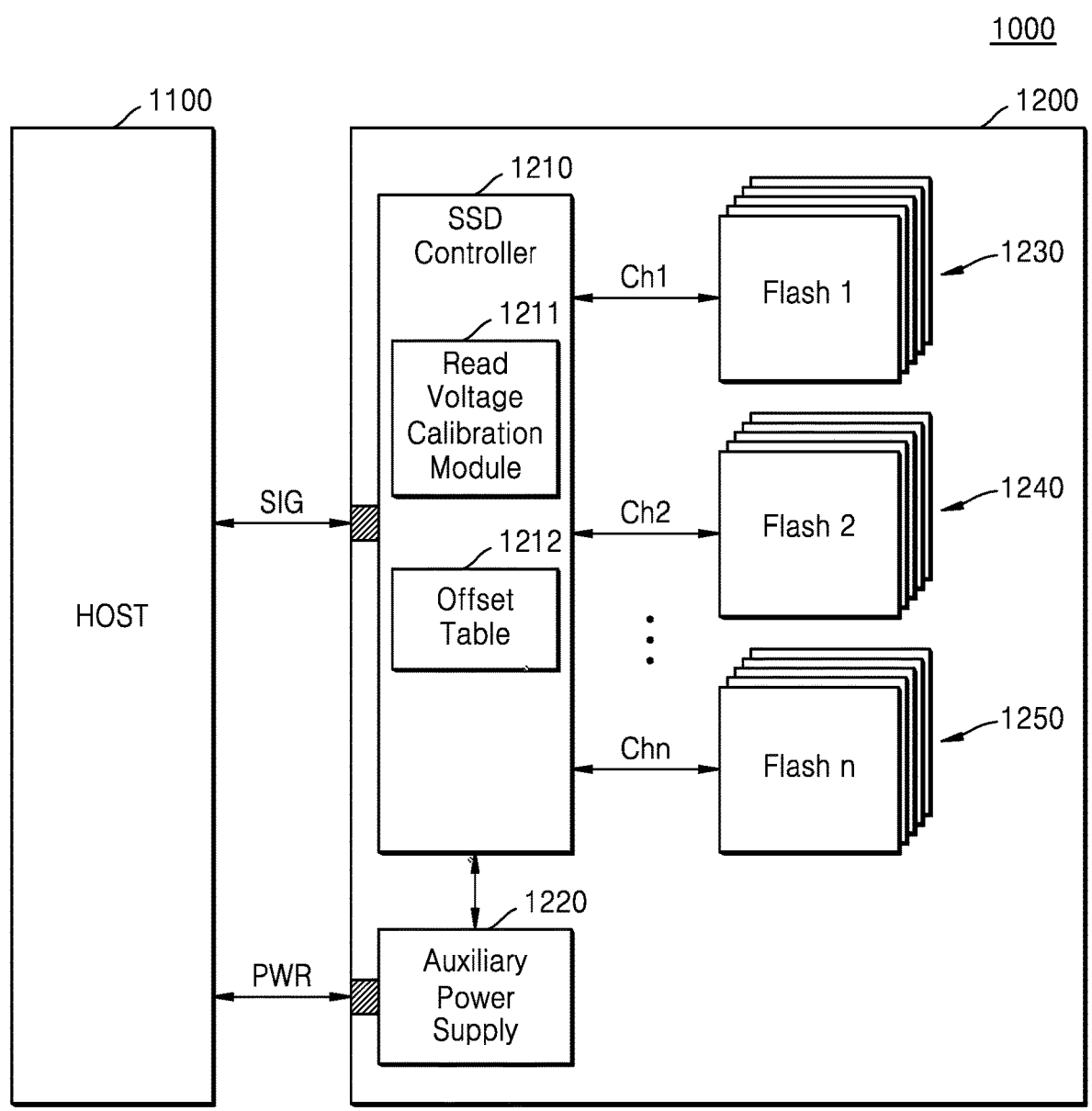
FIG. 12 is a block diagram illustrating an example of applying a memory device according to example embodiments to a solid-state drive system.

FIG. 12 is a block diagram illustrating an example in which a memory device according to example embodiments is applied to an SSD system 1000.

Referring to FIG. 12, the SSD system 1000 may include a host 1100 and an SSD 1200. The SSD 1200 may transmit and receive signals (SIG) to and from the host 1100 through a signal connector, and may receive power (PWR) through a power connector. The SSD 1200 may include an SSD controller 1210, an auxiliary power supply 1220, and memory devices 1230, 1240, and 1250. The SSD controller 1210 may communicate with the memory devices 1230, 1240, and 1250 through a corresponding channel (e.g., Ch1, Ch2, . . . , Chn). The memory devices 1230, 1240, and 1250 may be vertically stacked NAND flash memory devices. In this case, the SSD 1200 may be implemented using the embodiments described above with reference to FIGS. 1 to 12. Accordingly, the SSD controller 1210 may include a read voltage calibration module 1211 and an offset table 1212. According to an embodiment, the read voltage calibration module 1211 and the offset table 1212 may be implemented similar to the read voltage calibration module 115 and the offset table 116 in FIGS. 1 and 2. The SSD controller 1210 may correct read voltages required for read operations of the memory devices 1230, 1240, and 1250 using the read voltage calibration module 1211 and the offset table 1212. Each of the memory devices 1230, 1240, and 1250 may perform a valley search operation. The memory devices 1230, 1240, and 1250 may perform a read operation based on the corrected read voltage level by the controller of the SSD 1210.

Figure 13:
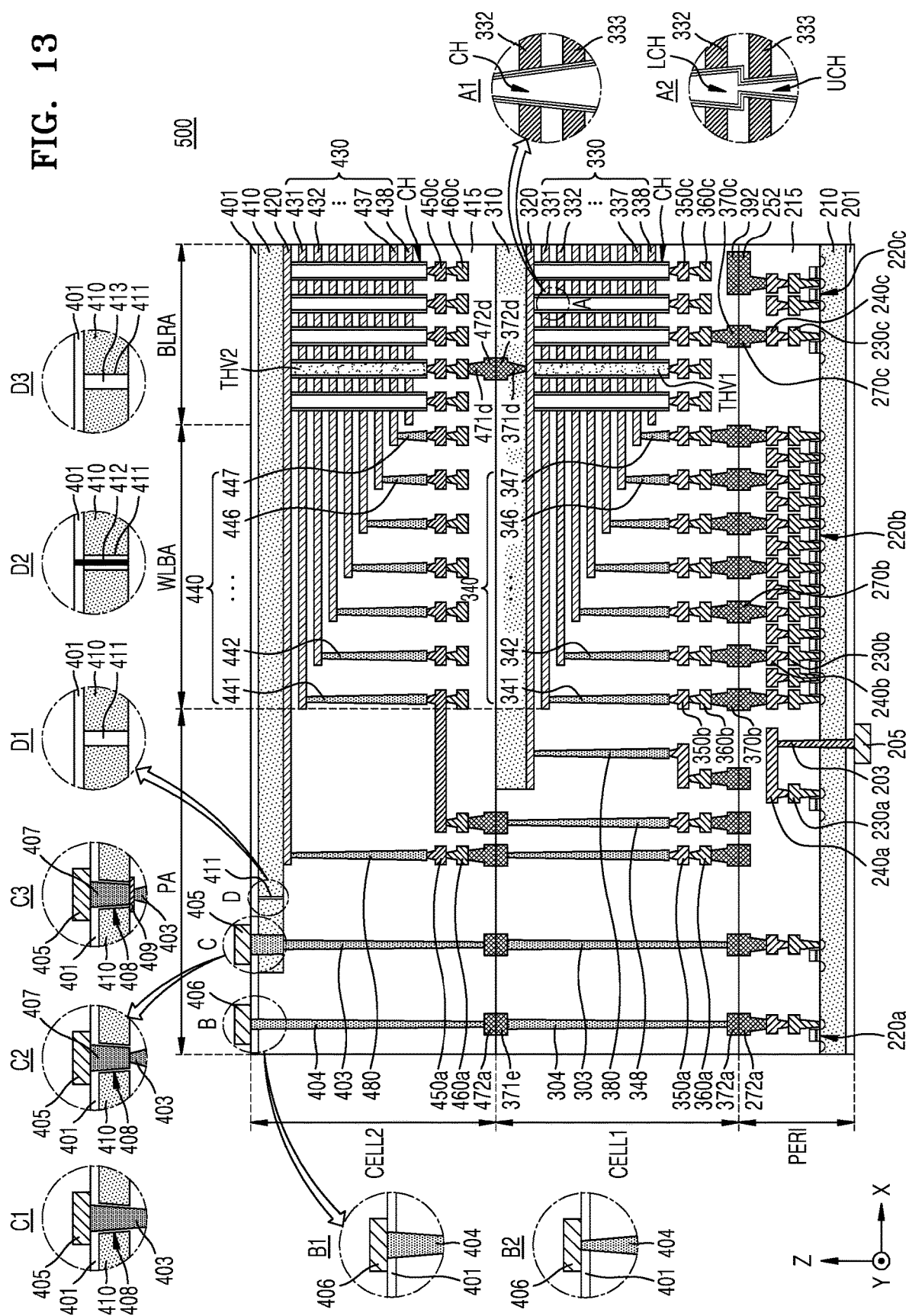
FIG. 13 is a cross-sectional view of a memory device according to an embodiment.

FIG. 13 is a view illustrating a memory device 500 according to an embodiment.

Referring to FIG. 13, the memory device 500 may have a chip-to-chip (C2C) structure. According to an embodiment, the memory device 500 may have a bonded vertical NAND (BVNAND) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminium (Al) or tungsten (W).

The memory device 500 may include the at least one upper chip including the cell region. For example, as illustrated in FIG. 13, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 13. However, embodiments are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220a, 220b and 220c formed on the first substrate 210. An interlayer insulating layer 215 including one or more insulating layers may be provided on the plurality of circuit elements 220a, 220b and 220c, and a plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in the present embodiments. However, embodiments are not limited thereto. In certain embodiments, at least one or more additional metal lines may further be formed on the second metal lines 240a, 240b and 240c. In this case, the second metal lines 240a, 240b and 240c may be formed of aluminium, and at least some of the additional metal lines formed on the second metal lines 240a, 240b and 240c may be formed of copper having an electrical resistivity lower than that of aluminium of the second metal lines 240a, 240b and 240c.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (i.e., the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (i.e., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In an embodiment, as illustrated in a region 'A1', the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350c and a second metal line 360c in the bit line bonding region BLBA. For example, the second metal line 360c may be a bit line and may be connected to the channel structure CH through the first metal line 350c. The bit line 360c may extend in a first direction (e.g., a Y-axis direction) parallel to the top surface of the second substrate 310.

In an embodiment, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 331 and 332 penetrated by the lower channel LCH is less than the number of the upper word lines 333 to 338 penetrated by the upper channel UCH in the region 'A2'. However, embodiments are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 13, the first through-electrode THV1 may penetrate the common source line 320 and the plurality of word lines 330. In certain embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In an embodiment, the first through-electrode THV1 and the second through-electrode THV2 may be electrically connected to each other through a first through-metal pattern 372d and a second through-metal pattern 472d. The first through-metal pattern 372d may be formed at a bottom end of the first upper chip including the first cell region CELL1, and the second through-metal pattern 472d may be formed at a top end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360c may be electrically connected to a page buffer included in the peripheral circuit region PERI. For example, some of the circuit elements 220c of the peripheral circuit region PERI may constitute the page buffer, and the bit line 360c may be electrically connected to the circuit elements 220c constituting the page buffer through an upper bonding metal pattern 370c of the first cell region CELL1 and an upper bonding metal pattern 270c of the peripheral circuit region PERI.

Referring continuously to FIG. 13, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350b and second metal lines 360b may be sequentially connected onto the cell contact plugs 340 connected to the word lines 330. In the word line bonding region WLBA, the cell contact plugs 340 may be connected to the peripheral circuit region PERI through upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder, and the cell contact plugs 340 may be electrically connected to the circuit elements 220b constituting the row decoder through the upper bonding metal patterns 370b of the first cell region CELL1 and the upper bonding metal patterns 270b of the peripheral circuit region PERI. In an embodiment, an operating voltage of the circuit elements 220b constituting the row decoder may be different from an operating voltage of the circuit elements 220c constituting the page buffer. For example, the operating voltage of the circuit elements 220c constituting the page buffer may be greater than the operating voltage of the circuit elements 220b constituting the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminium, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. Likewise, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 13, a lower insulating layer 201 may cover a bottom surface of the first substrate 210, and a first input/output pad 205 may be formed on the lower insulating layer 201. The first input/output pad 205 may be connected to at least one of a plurality of the circuit elements 220*a* disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220*a* disposed in the peripheral circuit region PERI through second input/output contact plugs 403 and 303, and the third input/output pad 406 may be connected to at least one of the plurality of circuit elements 220*a* disposed in the peripheral circuit region PERI through third input/output contact plugs 404 and 304.

In an embodiment, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In an embodiment, as illustrated in a region 'B1', the third input/output contact plug 404 may extend in a third direction (e.g., the Z-axis direction), and a diameter of the third input/output contact plug 404 may become progressively greater toward the upper insulating layer 401. In other words, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In certain embodiments, as illustrated in a region 'B2', the third input/output contact plug 404 may extend in the third direction (e.g., the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In certain embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In an embodiment, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments are not limited thereto, and in certain embodiments, the diameter of the second input/output contact plug 403 may become progressively less toward the second input/output pad 405.

In certain embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In certain embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371*e* or may become progressively greater toward the lower metal pattern 371*e*.

Meanwhile, in an embodiment, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In an embodiment, as illustrated in a region 'D1', the slit 411 may be formed to penetrate the third substrate 410. For example, the slit 411 may be used to prevent the third substrate 410 from being finely cracked when the opening 408 is formed. However, embodiments are not limited thereto, and in certain embodiments, the slit 411 may be formed to have a depth ranging from about 60% to about 70% of a thickness of the third substrate 410.

In certain embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In certain embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

Meanwhile, in certain embodiments, the first to third input/output pads 205, 405 and 406 may be selectively formed. For example, the memory device 500 may be realized to include only the first input/output pad 205 disposed on the first substrate 210, to include only the second input/output pad 405 disposed on the third substrate 410, or to include only the third input/output pad 406 disposed on the upper insulating layer 401.

In an embodiment, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering atop surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

While the inventive concept has been particularly shown and described with reference to embodiments thereof, it will be understood that various changes in form and details may be made therein without departing from the spirit and scope of the following claims.

What is claimed is:

1. A method of operating a memory controller for controlling a memory device including memory cells, the method comprising:
   transmitting a valley search command to the memory device;
   obtaining a cell count value and a valley voltage level from the memory device;
   obtaining an offset value by searching an offset table based on the cell count value and the valley voltage level;
   determining a read voltage level based on the valley voltage level and the offset value; and
   controlling the memory device to perform a read operation based on the read voltage level,
   wherein the cell count value indicates a number of memory cells belonging to a threshold voltage region adjacent to the valley voltage level,
   wherein the obtaining of the offset value from the offset table comprises:
      identifying a first offset value as the offset value based on the cell count value being included in a first cell count section, among a plurality of cell count sections; and
      identifying a second offset value as the offset value based on the cell count value being included in a second cell count section, among the plurality of cell count sections,
   wherein cell count values belonging to the second cell count section are greater than cell count values belonging to the first cell count section, and
   wherein the second offset value is less than the first offset value.

2. The method of claim 1, wherein the cell count value and the valley voltage level correspond to a distribution valley of a threshold voltage distribution of the memory cells detected based on a valley search operation performed by the memory device according to the valley search command.

3. The method of claim 1, further comprising:
   transmitting a read command to the memory device; and
   performing an error correction operation on data obtained based on the read command,
   wherein the valley search command is transmitted based on a failure of the error correction operation.

4. The method of claim 1, wherein the obtaining of the cell count value and the valley voltage level comprises:
   receiving valley search result information from the memory device; and
   obtaining the cell count value and the valley voltage level from the valley search result information.

5. The method of claim 1, wherein the obtaining of the offset value from the offset table further comprises:
   determining the first offset value as the offset value when the valley voltage level corresponds to a first state among a plurality of states, each of the plurality of states representing a value stored in the memory cells on a threshold voltage distribution of the memory cells; and
   determining the second offset value as the offset value corresponding to a second state having a higher threshold voltage level than the first state.

6. The method of claim 1, wherein the offset table comprises a plurality of offset values stored in the memory controller, and
   wherein each of the plurality of offset values is divided according to a first state to an N-th state respectively representing values stored in the memory cells on a threshold voltage distribution of the memory cells, and according to the plurality of cell count sections corresponding to the respective first to N-th states, where N is a natural number greater than 1.

7. The method of claim 6, wherein the obtaining of the offset value from the offset table comprises:
   identifying the first state corresponding to the valley voltage level among the first to N-th states from the offset table;
   identifying a first cell count section, among the plurality of cell count sections, corresponding to the cell count value from the offset table; and determining the first offset value, among the plurality of offset values, corresponding to the first state and the first cell count section as the offset value.

8. A memory controller comprising:
an offset table comprising a plurality of offset values; and
a processor configured to:
   transmit a valley search command to a memory device comprising memory cells;
   obtain an offset value, among the plurality of offset values, based on a cell count value and a valley voltage level obtained from the memory device;
   determine a read voltage level based on the valley voltage level and the offset value; and control the memory device to perform a read operation based on the read voltage level,
wherein the cell count value indicates a number of memory cells belonging to a threshold voltage region adjacent to the valley voltage level,
wherein the processor is configured to obtain the offset value from the offset table by:
   identifying a first offset value as the offset value based on the cell count value being included in a first cell count section, among a plurality of cell count sections; and
   identifying a second offset value as the offset value based on the cell count value being included in a second cell count section, among the plurality of cell count sections,
wherein cell count values belonging to the second cell count section are greater than cell count values belonging to the first cell count section, and
wherein the second offset value is less than the first offset value.

9. The memory controller of claim 8, wherein the memory controller further comprises an Error Correction Code (ECC) engine configured to perform an error correction operation on data obtained in response to transmitting a read command to the memory device,
   wherein the valley search command is transmitted to the memory device based on a failure of the error correction operation.

10. The memory controller of claim 8, wherein each of the plurality of offset values is divided according to a first state to an N-th state respectively representing values stored in the memory cells on a threshold voltage distribution of the memory cells, and according to the plurality of cell count sections corresponding to the respective first to N-th states, where N is a natural number greater than 1.

11. The memory controller of claim 10, wherein the processor is further configured to:
   identify the first state corresponding to the valley voltage level among the first to N-th states from the offset table;
   identify a first cell count section, among the plurality of cell count sections, corresponding to the cell count value from the offset table; and
   determine the first offset value, among the plurality of offset values, corresponding to the first state and the first cell count section as the offset value.

12. A memory system comprising:
a memory cell array comprising memory cells; and
a memory device comprising a control logic configured to control a read operation of the memory cells; and
a memory controller comprising:
   an offset table comprising a plurality of offset values; and
   a processor configured to:
      transmit a valley search command to a memory device comprising a plurality of memory cells;
      obtain an offset value, among the plurality of offset values, based on a cell count value and a valley voltage level obtained from the memory device;
      determine a read voltage level based on the valley voltage level and the offset value; and
      control the memory device to perform a read operation based on the read voltage level,
wherein the control logic is further configured to:
   generate valley search information comprising the cell count value and the valley voltage level obtained by performing, by the memory device, a valley search sensing operation on a threshold voltage distribution of the memory cells,
wherein the cell count value indicates a number of memory cells belonging to a threshold voltage region adjacent to the valley voltage level,
wherein the processor is configured to obtain the offset value from the offset table by:
   identifying a first offset value as the offset value based on the cell count value being included in a first cell count section, among a plurality of cell count sections; and
   identifying a second offset value as the offset value based on the cell count value being included in a second cell count section, among the plurality of cell count sections,
wherein cell count values belonging to the second cell count section are greater than cell count values belonging to the first cell count section, and
wherein the second offset value is less than the first offset value.

13. The memory system of claim 12, wherein the valley search information corresponds to a distribution valley of the threshold voltage distribution of the memory cells detected when the memory device performs a valley search operation according to the valley search command.

14. The memory system of claim 12, wherein the memory controller further comprises an Error Correction Code (ECC) engine configured to perform an error correction operation on data obtained in response to transmitting a read command to the memory device,
   wherein the valley search command is transmitted to the memory device based on a failure of the error correction operation.

15. The memory system of claim 13, wherein the memory device further comprises a cell counter configured to transmit, to the control logic, the cell count value generated by counting a number of memory cells for a threshold voltage region corresponding to the distribution valley.

16. The memory system of claim 12, wherein the processor is further configured to:
   determine the first offset value as the offset value when the valley voltage level corresponds to a first state, among a plurality of states, each of the plurality of states representing a value stored in the memory cells on the threshold voltage distribution of the memory cells, and
   determine a second offset value as the offset value corresponding to a second state, among the plurality of states, having a higher threshold voltage level than the first state,
wherein the second offset value is less than the first offset value.

17. The memory system of claim 12, wherein each of the plurality of offset values is divided according to a first state to an N-th state respectively representing values stored in the memory cells on the threshold voltage distribution of the memory cells, and according to the plurality of cell count sections corresponding to the respective first to N-th states, where N is a natural number greater than 1.

18. The memory system of claim 17, wherein the processor is further configured to:
- identify the first a state corresponding to the valley voltage level among the first to N-th states from the offset table;
- identify a first cell count section, among the plurality of cell count sections, corresponding to the cell count value from the offset table; and
- determine the first offset value, among the plurality of offset values, corresponding to the first state and the first cell count section as the offset value.

* * * * *